United States Patent

[11] 3,581,762

| [72] | Inventor | Kenneth A. Bracki<br>Mount Prospect, Ill. |
|---|---|---|
| [21] | Appl. No. | 751,939 |
| [22] | Filed | Aug. 12, 1968 |
| [45] | Patented | June 1, 1971 |
| [73] | Assignee | Parker-Hannifin Corporation<br>Cleveland, Ohio |

[54] SPEED CONTROL VALVE FOR FLUID MOTORS
3 Claims, 2 Drawing Figs.

[52] U.S. Cl. ................................................. 137/271,
137/596.2
[51] Int. Cl. ............................................. F16k 47/10
[50] Field of Search ................................... 137/271,
556, 514.5, 599, 599.1, 329.02, 454.5, 454.6,
614.21, 614.2, 596.2, (Inquired); 251/117; 91/28,
29, 26, 27, 407, 432, 458, 443, (Inquired)

[56] References Cited
UNITED STATES PATENTS

| 976,713 | 11/1910 | Wilkins | 137/625.36X |
|---|---|---|---|
| 1,567,030 | 12/1925 | Bryant | 137/625.36X |
| 2,990,721 | 7/1961 | Spence | 137/625.36X |
| 3,177,892 | 4/1965 | Grandstaff | 137/625.34X |
| 2,408,338 | 9/1946 | Parsons | 91/443X |
| 2,524,114 | 10/1950 | Millat | 91/29X |
| 2,841,174 | 7/1958 | Frye | 137/514.5 |
| 3,025,838 | 3/1962 | Klancnik | 91/443 |
| 3,085,592 | 4/1963 | Zajac et al. | 137/556 |
| 3,202,060 | 8/1965 | Grotness | 91/443 |
| 3,441,249 | 4/1969 | Aslan | 137/556X |

*Primary Examiner*—M. Cary Nelson
*Attorney*—John N. Wolfram

ABSTRACT: A speed control valve for fluid motors in which the flow passages through the valve body are formed by a first bore extending part way into the valve housing, a second bore of smaller diameter extending toward the first bore, a third bore extending transversely of the first and second bores and intersecting the first bore, a fourth bore connecting the second and third bores, and a valve element seating on the intersection of the third and fourth bores to control flow of fluid between the first and second bores. There may also be a fifth bore connecting the first and fourth bores and a second valve element seating on the intersection of the fourth and fifth bores to further control flow of fluid between the first and second bores.

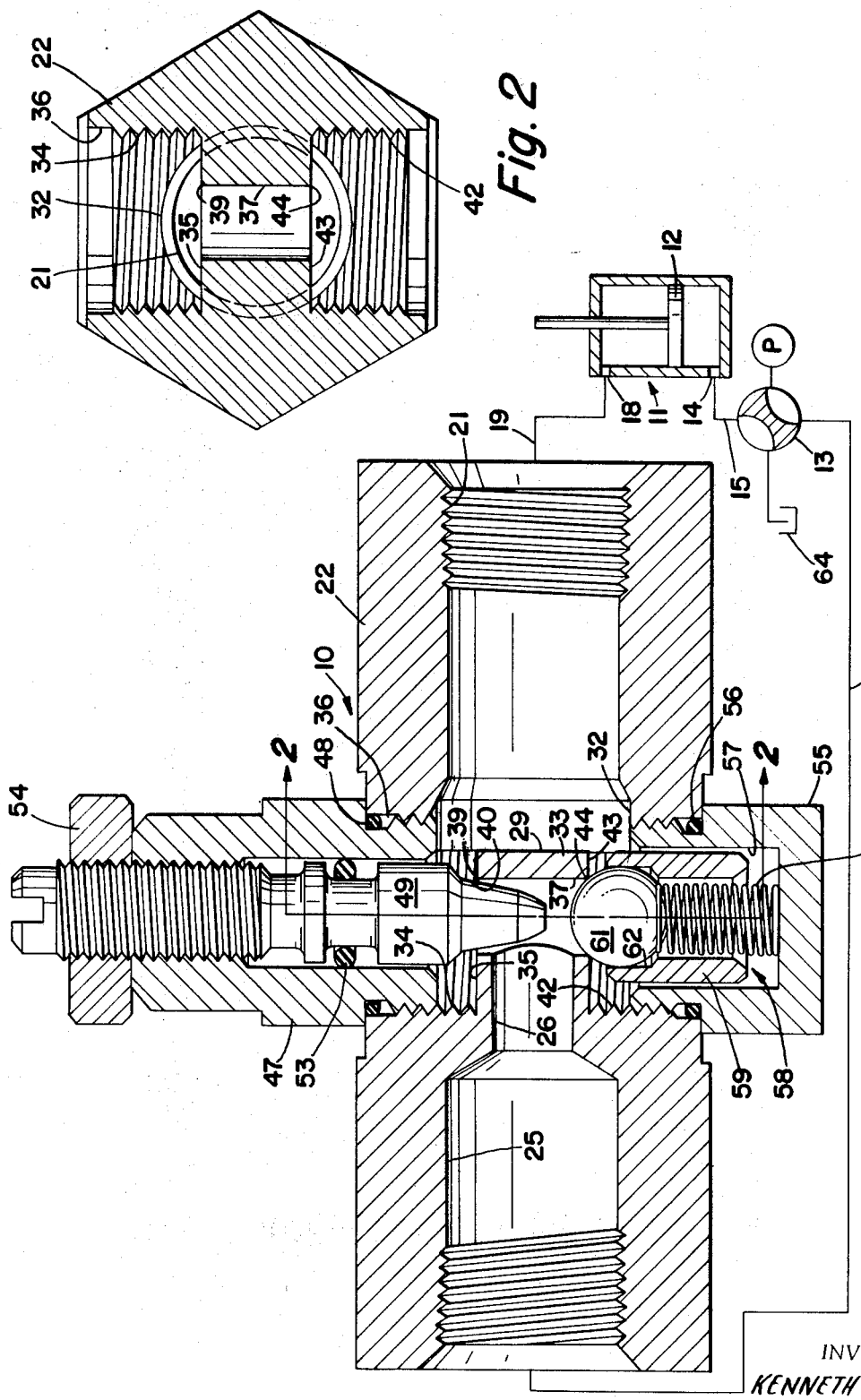

SPEED CONTROL VALVE FOR FLUID MOTORS

BACKGROUND OF THE INVENTION

In some forms of speed control valves for cylinder-type fluid motors the valve permits free flow of fluid therethrough to the motor for operation of the motor piston in one direction and restricts flow of fluid from the motor to develop a back pressure therein to slow up movement of the piston in the opposite direction. An adjustable valve element permits varying of the restriction to thus vary the speed of the piston in the opposite direction and a one way valve permits the free flow of fluid to the motor and blocks flow of fluid from the motor through the valve except for the fluid passing through the restriction.

It is highly desirable that such speed control valves be economical to manufacture and that they be symmetrical in the sense that the valve seats, flow passages and valve element mountings permit interchanging of the adjustable and one way valves to suit particular installations.

BRIEF DESCRIPTION OF THE INVENTION

The invention accomplishes the above objectives by providing a valve body that may be made from a solid bar and have flow passages and valve seats that are quickly and easily formed by simply drilling a series of holes that intersect in a particular manner. More specifically, a first bore extends part way into the body, a second bore of smaller diameter extends from an opposite side toward the first bore but terminates short thereof, a third bore extends transversely of the first and second bores and intersects the former, a fourth bore intersects the second and third bores, and a fifth bore intersects the first and fourth bores. The intersections of the fourth bore with the third and fifth bores provide identical valve seats upon which the one way and adjustable valve elements may be interchanged.

DRAWINGS

FIG. 1 is a cross section view of the valve as installed in a schematically shown fluid power system.

FIG. 2 is a cross section of the valve body along the lines 2–2 of figure 1.

DESCRIPTION

As shown in FIG. 1, speed control valve 10 may be used in conjunction with a fluid motor 11 having a piston 12 therein that may be actuated in either direction by fluid pressure supplied by pump P and controlled by a directional valve 13. The fluid motor has a port 14 connected by line 15 to valve 13 and has another port 18 connected by line 19 to a first bore 21 in speed control valve body 22. Another line 24 connects valve 13 to a second bore 25 in body 22.

In body 22 first bore 21 extends only part way thereinto and has a flat bottom 29 at its inner end. Inner end portion 32 of first bore 21 may be enlarged as shown. Second bore 25 is coaxial with bore 21 and extends towards the latter but terminates short thereof so that there is a wall 33 therebetween. At least the inner end portion 26 of bore 25 is of smaller diameter than the inner end portion 32 of bore 21.

A threaded third bore 34 having a flat bottom 35 extends inwardly in a direction transverse of bores 21, 25 and intersects inner end portion 32 of bore 21 but terminates short of bore 26. Bore 34 has an outer counterbore 36.

A fourth bore 37 is coaxial with bore 34 and intersects the flat bottom 35 of the latter to form a first valve seat 39 and it also intersects inner end portion 26 of second bore 25.

A threaded fifth bore 42 having a flat bottom 43 is coaxial with bores 34 and 37 and intersects inner end 32 of bore 21 and also intersects bore 37 to form a second valve seat 44 identical to valve seat 39. Bore 42 has a counterbore 46 and is identical with bore 34.

Threadably mounted in bore 34 is a bonnet 47 that is sealed relative to body 22 by an elastomeric O-ring 48. Threadably mounted within bonnet 47 is a needle valve 49 engageable with seat 39 and sealed relative to the bonnet by a packing 53 and lockable in a set position by locknut 54.

Threadably mounted in bore 42 is a plug 55 that is sealed relative to body 22 by a packing 56. Slidably mounted in bore 57 of plug 55 is a one way valve 58 comprising a sleeve 59 having a ball 61 press fitted into a counterbore 62. A spring 63 bears against plug 55 and ball 61 to urge the latter toward seat 44.

Body 22 is initially a solid bar and the bores just described are easily machined therein in the manner indicated to economically provide flow passages and valve seats. Thus no coring, angle drilling or other expensive or difficult machining operations are required.

OPERATION

With valve 10 connected to fluid motor 11 as shown, valve stem 49 is adjusted and locked by locknut 54 into a position relative to seat 39 to provide a restricted flow path 40 therebetween, as desired. Spring 63 normally keeps one way valve 58 in a closed position against seat 44.

With valve 13 set as shown, fluid under pressure from pump P will flow through line 24 and bore 25 to bore 37. Part of this fluid passes through the restricted opening 40 between needle valve 49 and seat 39 but most of the fluid will act on one way valve 58 to move the latter off its seat 44 a sufficient distance to result in free flow of fluid from bore 37 to bores 42 and 21 to line 19 and port 18 to act upon piston 12 to urge the latter in a downward direction. At the same time, fluid below piston 12 exhausts through port 14, line 15 and valve 13 to reservoir 64.

Upon shifting of valve 13, pump P will be connected to line 15 and line 24 will be connected to reservoir 64. In this position, pressure fluid in line 15 enters port 14 to move piston 12 in an upward direction and fluid above piston 12 is exhausted through port 18, line 19, bores 21, 34, restriction 40, bores 37 and 25, line 24 and valve 13 to reservoir 64. Meanwhile, spring 63 has seated one way valve 58 to block flow of fluid from bore 21 through bore 42 to bore 37.

Because of restriction 40 the fluid from the upper side of piston 12 returns to reservoir 64 as described at a low rate of flow. This causes a buildup of pressure in motor 11 above piston 12 to restrict the speed at which piston 12 moves upwardly. The rate at which piston 12 moves upwardly may be adjusted by changing the size of restricted opening 40 by resetting the position of valve 49.

Because bores 34 and 42, with their respective threaded and counterbored portions are identical, bonnet 47 and plug 55, with their respective valves 49 and 58, may be interchanged to accommodate mounting clearance or other problems in particular installations.

I claim:

1. A speed control valve for a fluid motor comprising a housing having a first bore extending part way into the housing from one side thereof, a second bore extending from another side of the housing toward the first bore and terminating short of said first bore; the second bore being of less diameter than the first bore, a third bore extending toward the first bore in a direction transverse thereto and directly intersecting the first bore, a fourth bore intersecting the second and third bores and connecting the same, the intersection of the third and fourth bores forming a valve seat, and a movable valve element mounted in the housing and cooperating with the valve seat to control flow of fluid between the first and second bores via the third bore, a fifth bore intersecting the first and fourth bores, the latter intersection forming a second valve seat, and a second valve element in the housing cooperating with the second valve seat to control flow of fluid between the first and second bores via the fifth bore, said first and second valve seats being identical whereby said first and second valve elements may be interchanged.

2. A speed control valve for a fluid motor comprising a housing having a first bore extending part way into the housing from one side thereof, a second bore extending from another side of the housing toward the first bore and terminating short of said first bore; the second bore being of less diameter than the first bore, a third bore extending toward the first bore in a direction transverse thereto and directly intersecting the first bore, a fourth bore intersecting the second and third bores and connecting the same, the intersection of the third and fourth bores forming a valve seat, and a movable valve element mounted in the housing and cooperating with the valve seat to control flow of fluid between the first and second bores via the third bore, a fifth bore intersecting the first and fourth bores, the latter intersection forming a second valve seat, and a second valve element in the housing cooperating with the second valve seat to control flow of fluid between the first and second bores via the fifth bore, the third and fifth bores containing first and second structures supporting said first and second valve elements, respectively, and said third fifth bores are identical to the extent that said first and second structures are interchangeable therein.

3. The valve of claim 2 in which said first and second structures have inner ends that are substantially tangent to the inner end of the first bore.